United States Patent Office 3,076,356
Patented Feb. 5, 1963

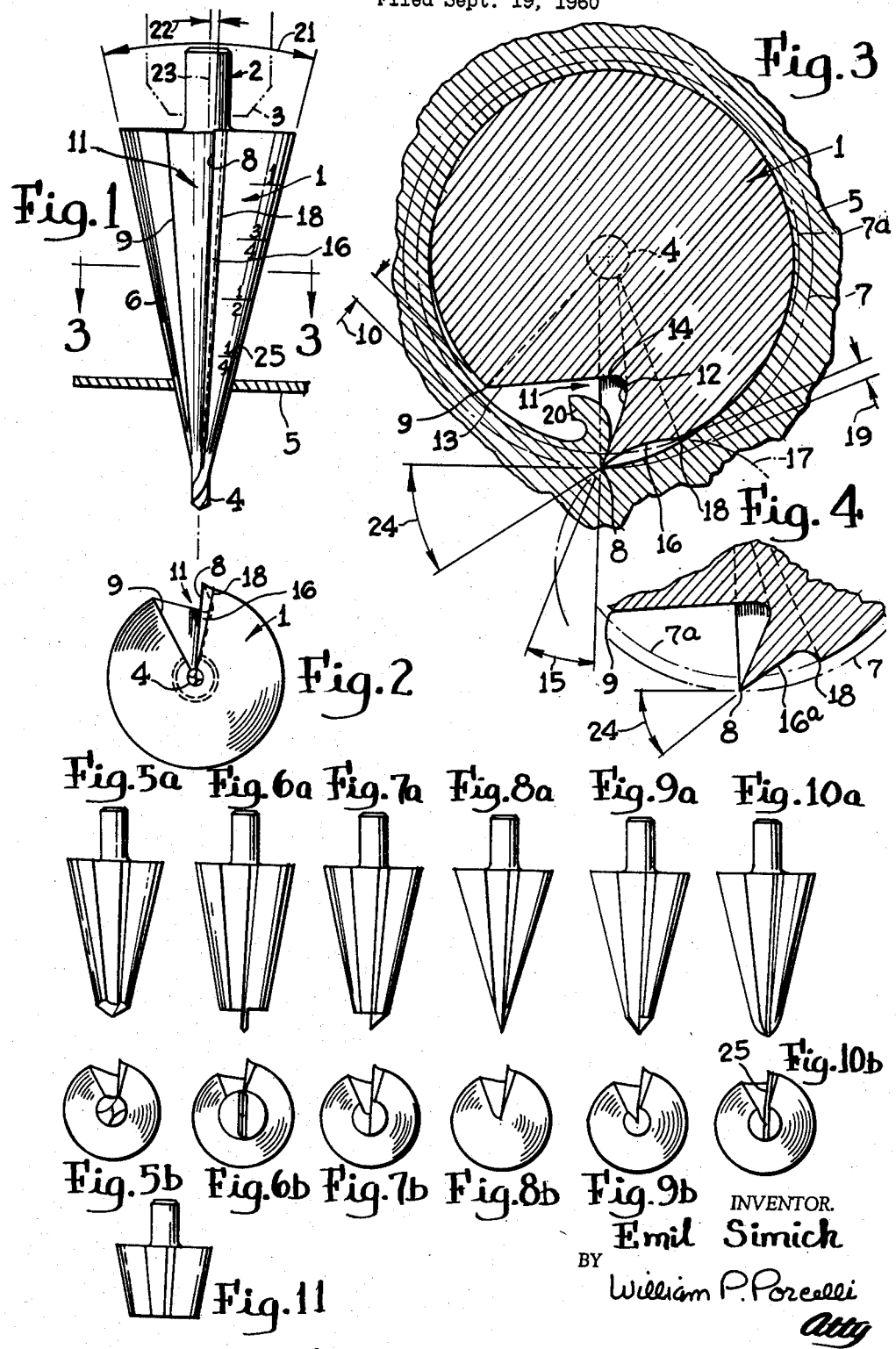

3,076,356
CUTTING TOOL
Emil Simich, 4341 W. Marquette Road, Chicago, Ill.
Filed Sept. 19, 1960, Ser. No. 57,048
21 Claims. (Cl. 77—67)

This invention relates to the art of cutting tools and particularly to one for efficiently cutting circular openings through sheet materials such as sheet metal, plastic, wood and other sheet materials.

Presently, there are several forms of cutting tools available for cutting circular holes through sheet materials. However, they all seem to have certain disadvantages. Among their principal disadvantages are high cost, some require adjustment to make different size openings, others use a different tool for each hole size and, so, require a full set of tools for a full range of hole sizes. Few, if any can be used efficiently for cutting through very thin sheet material which may be as thin as .002 inch.

It is the principal object of this invention to provide an improved cutting tool in the form of a cone shaped drill which can be used to efficiently cut circular holes through sheet materials of many kinds and thicknesses and even through very thin sheet materials.

It is another object of the invention to provide such an improved cutting tool having an improved cutting region design which insures a clean cutting action during the hole cutting operation through sheet material to provide a clean and smooth edged hole.

It is still another object of the invention to provide such an improved cutting tool having an improved cutting region design which progressively cuts a hole in sheet material in a helical path extending radially outward from the center of rotation of the cutting tool and which cuts cleanly rather than push or compress the metal with the possibility of building up sheet material on the cutting tool surface and producing a burr on the hole edge and also shortening the life of the cutting tool by rapidly dulling its cutting edge.

It is another object of the invention to provide a cutting tool design of a drill type which only requires a minimum axial force to efficiently cut a hole in sheet material.

It is another object of the invention to provide such an improved cutting tool which is especially designed to direct the cutting chip, as the hole is being formed, either above or below the level of the work piece so that the cutting chip properly clears the work piece and does not interfere with the cutting action.

It is another object of this invention to provide such an improved cutting tool which, in one form, has angular dimensions best suited for cutting through soft materials such as aluminum and annealed steel and which, in another form, has angular dimensions best suited for cutting through harder materials such as harder steel.

Other objects and advantages of the invention can be understood upon reference to the accompanying drawings in which:

FIG. 1 shows a side view of a preferred embodiment of the cutting tool of this invention as it appears when being used to cut through sheet material.

FIG. 2 shows a bottom view of the cutting tool of FIG. 1.

FIG. 3 shows a sectional view along the line 3—3 of FIG. 1 and particularly shows the cross sectional shape of the cutting portions of the cutting tool and its relationship to the sheet material being cut.

FIG. 4 shows a fragmentary section similar to FIG. 3 except that it shows an alternate cutting region construction.

FIG. 5a shows a side view of an alternate embodiment of the invention.

FIG. 5b shows a bottom view of the tool shown in FIG. 5a.

FIGS. 6a, 7a, 8a, 9a and 10a show other alternate embodiments of the cutting tool.

FIGS. 6b, 7b, 8b, 9b and 10b show bottom end views, respectively, of these cutting tools and are views similar to FIG. 5b, and FIG. 11 shows a side view of still another alternate embodiment of the invention.

As shown in FIG. 1 the preferred form of cutting tool is provided with a main body 1 which is basically in the form of a cone shape. This body 1 is provided at its upper end with a cylindrical shank 2 which is ordinarily inserted into a drill chuck 3 of a conventional drilling machine which is used to power the cutting tool. The body 1 terminates at its lower end with a short length 4 in the form of a conventional twist drill which is used to produce a small hole in the sheet material 5 prior to enlarging it and cutting the larger hole with the body 1 of the cutting tool. The outer surface 6 of the body 1 is of generally cone shape, but formed on a helix so that, as viewed in FIG. 3, its cross sectional shape is principally helical.

As viewed in FIG. 3, there is shown an imaginary circle 7 in phantom outline. This circle represents one which is formed by the cutting edge 8 of the cutting tool when it is rotated on its axis which passes centrally through both the shank 2 and the twist drill portion 4. The surface 6 is relieved gradually and increasingly to follow the helical shape and terminates at another edge 9. This helical surface 6 begins at an edge 18 which is radially inward of the cutting edge 8 by an amount of radial relief equal to the dimension 19. This edge 18 is on a second imaginary circle 7a formed by the edge 18 when the cutting tool is rotated on its axis passing centrally through both the shank 2 and the twist drill portion 4. The maximum radial relief which is at edge 9 is indicated by the dimension at 10 which can be referred to as the lead of the spiral and this lead is approximately .008 inch per revolution in the preferred embodiment but can vary between .006 and .012 inch. This lead is the amount of relief between the imaginary circle 7 and the edge 9.

Between the edge 9 and the cutting edge 8, is a flute 11 extending radially inward of the cutting tool. It is provided with a sidewall 12 and another sidewall 13 joined together by means of a curved bottom surface 14. The flute 11 must be deep enough to provide for free removal of the chips formed during the cutting.

An important angle which is referred to as the rake angle is indicated at 15 and this rake angle is preferably about 20 to 45 degrees for soft material such as soft aluminum and annealed steel and should be about 10 to 20 degrees for hard aluminum, harder steels and other harder materials. The rake angle is the angle the wall 12 makes with a radius of the imaginary circle 7 extending through the cutting edge 8.

The cutting edge 8 is provided by the intersection of the wall 12 with another wall 16. The other wall 16 connects to the outer surface 6 of the body 1 of the cutting tool at edge 18, but is actually a modified or minor flute extending for the entire length of the body 1. It is produced, in its preferred form by a grinding wheel having a radius along the imaginary circle indicated at 17. The width of this wall 16 need only be from the cutting edge 8 to its other edge 18 where the lead or the dimension 19 between the imaginary circle 7 and the edge 18 of the tool is about .002 inch. Satisfactory results can be achieved when this dimension 19 is between .001 and .004 inch. However, if less than .001 inch, the cutting action is poor and above .004 inch chatter may occur. In addition to the dimension 19 being important, the relief angle indicated at 24 is likewise. This angle 24 is the angle the surface 16 makes with a tangent to the imaginary circle 7 at the cutting edge 8. It is preferably six degrees, but can vary between three and twelve degrees with satisfactory results. If the relief angle is less than three degrees, poor cutting action occurs. If it is larger than twelve degress, too rapid dulling of the cutting edge 8 occurs.

The design of the cutting portions of the cutting tool are extremely important in providing a good clean cutting action with no binding of the cutting tool and without the formation of burs on the sheet material being cut and without the build up of metal from the sheet material on the cutting tool by a swaging or wiping action between the tool and the sheet material which might otherwise occur. The manner of achieving a clean cut is by having the wall 12 with the proper rake angle and by having the proper relief and relief angle as described behind the cutting edge 8 created by the concave wall or flute 16.

The significance of the relief at dimension 19 is that the helical shape of the surface 6 begins at edge 18 rather than as a continuation of a helical path from the cutting edge 8. The cutting edge 8 is deliberately extended radially beyond the natural helical path so that the cutting edge 8 always tends to bite or cut into the work piece by an amount equal to the relief 19 in the manner that a wood plane cuts into the wooden work piece when planing. If the cutting edge 8 did not extend radially beyond the natural helical path, there would be no tendency to bite or cut into the work piece which would be much the same situation as when the blade of a wood plane is flush with the bottom surface of the plane. Further, slight dulling of the cutting edge 8 of the tool embodying the invention will not reduce the cutting action significantly because the cutting edge 8 still protrudes radially to tend to bite in and cut. If the cutting edge 8 would be on the natural helical path of the surface 6, even slight dulling would tend to cause the then slightly rounded cutting edge 8 to ride over the metal and cut poorly by pushing or compressing the metal ahead of and in the region immediately following the cutting edge to cause binding, burs, and build up of metal or material on the cutting tool. With such an arrangement, greater cutting force is required and the cutting result is inferior or completely objectionable. The cutting tool of this invention eliminates these difficulties.

As an alternate embodiment of the cutting edge 8 the wall 16 can be relieved in the manner shown at 16a in FIG. 4. In that drawing the wall 16a is not cut on a radius. However, it is concave which is the important feature. It is provided by a straight wall portion with a three to twelve degree relief angle 24 leading from the cutting edge 8 and connects to an abrupt radius portion connected to the edge 18.

Another important angle of the cutting tool is indicated at 21 in FIG. 1. It is the taper or cone angle of the body 1. It is preferably about 25 degrees optimum, but should be in the range between ten and fifty degrees. It should be more than ten degrees in order to reduce the length of the tool to a practical dimension and to maintain some degree of resistance to the longitudinal cutting force component so as to retard the forward movement of the tool and keep it from driving forward too fast which might result in the tool binding in the sheet material. Another reason for the minimum of ten degrees is that below this angle the tool approximates a self locking taper which is known to be about eight degrees on conventional tools. Any binding action should be eliminated, if possible. The taper angle should be less than fifty degrees in order to reduce the longitudinal force required to cause the tool to properly bite into the metal without deforming it. This is especially important if the sheet material being drilled is thinner and where no backing might be available for support, which is often the situation. Another reason why the taper angle should not be more than fifty degrees is that it is desirable to make the hole being cut appear as one with approximately parallel sidewalls, or else as close to parallel as possible.

There is one other angle of significance and that is the angle indicated at 22 in FIG. 1. This angle is that which is formed between the vertical axis 23 and the slope of the cutting edge 8. If it is as shown in FIG. 1, upon cutting of the hole, the cutting chip 20 is directed above the level of the sheet material 5 clear of it. If the cutting edge 8 is oppositely relative to the center line 23 from that shown in FIG. 1, the cutting chip 20 is directed below the sheet material 5 being cut and it is also directed clear of the sheet material. If the angle is zero so that the cutting edge 8 lies in a plane including the axis or center line 23, then the cutting chip 20 may interfere with the sheet material 5 and possibly create a bind, particularly in thicker material. A zero angle at 22 ordinarily is not objected to when the chip formation is necessarily granular, such as with ceramics, rather than as a continuous ribbon. Natually, this depends upon the type of material being cut.

The cone shape of the drill or cutting tool has a distinct advantage as to range of hole size cutting. Because of this shape, a single drill can be used to cut may different hole sizes. For convenience the outer surface 6 of the body 1 can be indelibly marked or engraved with numerals and lines as at 25 to indicate the hole size achieved by penetrating the cutting tool into the sheet material up to the marked line. This facility of the cutting tool to be used for a wide range of hole diameters is a distinct advantage over many other tools which either require adjustment to go from one hole size to another or require a separate tool for each hole size. As an alternate so as to avoid marking the wall 6, the wall of one flute 11 can be marked instead.

In FIGS. 5a through 11 there are shown several alternate embodiments wherein the lower end of the cutting tools are different for the purpose of drilling through different materials with the greatest efficiency. All of the lower ends shown, except 11, are conventional type ends used on other types of drilling tools. In FIGS. 5a and 5b, there is a wide drill point which is particularly useful for drilling through ductile metals. In FIGS. 6a and 6b there is shown a spade point which is a general purpose point adapted for drilling through brittle materials as well as ductile metals. In FIGS. 7a and 7b there is shown a spear point which finds preferred use with ceramics and other brittle materials. FIGS. 8a and 8b show a cone point which is nothing more than a continuation of the body 1 down to a sharp point and this may be used successfully on very thin sheet metal or plastics into which a pilot hole can readily be pierced. FIGS. 9a and 9b show a blunt cone point which is a modified form of that which is shown in FIGS. 8a and 8b. This would seem to have greater value for ductile metals. In FIGS. 10a and 10b there is shown a spear point like FIGS. 7a and 7b except that a carbide insert 25 is secured thereto to increase its wearing properties. This type of point would find greater use for heavy duty service on ceramics and other abrasive materials. The embodiment shown in FIG. 11 is merely the standard cutting tool of FIG. 1 with its lower end cut off. This tool can be used for enlarging existing holes. It also has advantage for enlarging holes in the walls of pipes without the production of burs at the inner edges of the holes. Without this tool, the means used to produce the holes creates a bur which must be removed. The manner of removal is extremely difficult, especially on long pipe lengths, because the deburring tool must be inserted lengthwise through the pipes. With this tool the expensive and difficult deburring operation is eliminated.

It should be emphasized that the end points on the tools shown are merely for properly starting a hole in the sheet material to be drilled. After the hole is once begun, then the cutting edge 8 on the body 1 of the cutting tool goes into action to properly cut a clean hole through the sheet material.

Although not indicated as such, any one of the embodiments shown can use a hardened insert such as the carbide insert 25 shown in FIGS. 10a and 10b and this insert can be extended for the entire cutting edge 8 of the tool in order to prolong its cutting life. In most cases, however, a mere hardening of the cutting edge or of the entire cutting tool by conventional heat treating means and by using the proper grade of steel will produce a satisfactory result and provide a tool with sufficient cutting life.

It has been mentioned that the relief angle 24 can vary between the limits of three and twelve degrees and the relief 19 between .001 and .004 inch. It has been determined that, in order to maintain a constant relief dimension at 19, the angle 24 must vary from end to end of the tool. Conversely, in order to maintain a constant relief angle 24, the relief dimension at 19 must vary from end to end of the tool. Also, it is possible to have both the relief dimension at 19 and the angle 24 vary. But, in any case, as long as the dimension 19 is within the range of .001 to .004 and the angle 24 is between three and twelve degrees, good cutting results can be expected even though both or either may vary. As examples of how the angle 24 can vary from end to end on the FIG. 3 type, it has been established that if a .002 inch dimension 19 is maintained, at .70 inch radius of the circle 7a on one end, the angle 24 is three degrees and thirty-five minutes. At a radius of the circle 7a of .096 inch at the small end, the angle 24 works out to be eleven degrees and twenty-two minutes.

It is possible that the flute 16a of FIG. 4 can be a flat surface tangent to the imaginary circle 7a at the point 18 and still be within the stated limits and provide satisfactory results. In this case the flute 16a is not in the true sense a flute since it is not concave. However, for purposes of this application including the language of the claims, such a tangential flat surface may be considered as a flute with a zero depth in the sense intended by this invention. As an example of the conditions for maintaining a flat tangential flute 16a for the entire length of the tool, it has been determined that by maintaining the dimension 19 as .002 inch for the entire tool length, the angle 24 is equal to ten degrees at a diameter of approximately .27 inch diameter of the circle 7a. At six degrees, the diameter is approximately .77 inch, and at four degrees it is approximately 1.67 inches.

Although a single preferred embodiment of the invention and several alternate embodiments of it have been shown, it should be understood that the invention can be made in many different ways without departing from the true scope of the invention as defined by the appended claims.

I claim:

1. A cutting tool for cutting round holes in sheet material comprising, a body having a tapered side wall imparting a cone-shape thereto, said tapered side wall being formed on a helix with a small lead per revolution, said body being provided with a first longitudinal flute having a cutting edge, and a second longitudinal flute extending from said cutting edge to said tapered side wall.

2. A cutting tool for cutting round holes in sheet material comprising, a body having a tapered side wall imparting a cone-shape thereto, said body being provided with a first longitudinal flute extending inwardly of said body, said first flute having a U-shaped wall intersecting the tapered side wall of the body along two spaced apart edges, the first of which edges forms a sharp cutting edge, a second longitudinal flute extending inwardly of said body with its wall connected between said cutting edge and the leading edge of said tapered side wall of the body, the tapered side wall of the body being formed on a helix with a small lead per revolution providing a gradually increasing relief from the leading edge of said tapered side wall around the surface of the body to the trailing edge of the tapered side wall which is the second edge of said first flute, said small lead determining the approximate depth of cut.

3. A cutting tool for cutting round holes in sheet material comprising, a body having a cone-shape imparted to it by a tapered side wall extending longitudinally from a wide portion to a narrow portion, said tapered side wall being formed in a helical shape with a small lead per revolution providing a gradually increasing relief around the tapered side wall, said body being provided with first and second longitudinal flutes positioned between the longitudinal edges of the tapered side wall and adjacent to each other with their walls intersecting each other to form a cutting edge between the flutes at the periphery of the body.

4. A cutting tool as defined by claim 3 characterized by, said tapered side wall having graduated markings on it for determination of hole size.

5. A cutting tool as defined by claim 3 characterized by, said cone-shaped body having at its narrow portion a longitudinally extending drill end for initiating the cutting of a hole through the sheet material.

6. A cutting tool for cutting holes in sheet material comprising, a body having a cone shape imparted to it by a tapered side wall extending longitudinally from a wide portion to a narrow portion, said tapered side wall being formed in a helical shape with a small lead per revolution providing a gradually increasing relief around the tapered side wall, said body being provided with first and second longitudinal flutes positioned between the longitudinal edges of the tapered side wall and adjacent to each other with their walls intersecting each other to form an outwardly directed longitudinally extending cutting edge between the flutes, said tapered side wall having graduated markings on it for determination of hole size, and said cone-shaped body having at its narrow portion a longitudinally extending drill end for initiating the cutting of a hole through the sheet material.

7. A cutting tool as defined by claim 6 characterized by, said cutting edge being inclined from the longitudinal axis of the cutting tool so as to direct the chips being cut from the hole being formed angularly away from the plane of the sheet material.

8. A cutting tool for cutting round holes in sheet material comprising, a body having a cone-shape imparted to it by a tapered side wall with a cone angle of from ten to fifty degrees, said tapered side wall being formed in a helical shape with a lead of from .006 to .012 inch per revolution providing a gradually increasing radial relief around the tapered side wall, said body being provided with first and second longitudinal flutes positioned between the ends of the tapered side wall and peripherally adjacent to each other with their walls intersecting each other to form a longitudinal cutting edge between the flutes at the periphery of the body, said cutting edge having approximately a ten to forty-five degree rake angle on its forward side created by the wall of the first flute, and on its rear side approximately a three to twelve degree relief angle with the periphery of the hole being cut created by the wall of the second flute.

9. A cutting tool as defined by claim 8 characterized by said second flute extending from the cutting edge to an edge on the tapered side wall where the radial relief between the cutting edge and the helix is from .001 to .004 inch.

10. A cutting tool as defined by claim 1 characterized by, said cutting edge extending radially beyond the region where the natural path of the helix of the tapered side wall immediately adjacent to the second longitudinal flute intersects a radius extending through the cutting edge.

11. A cutting tool as defined by claim 2 characterized by, said cutting edge extending radially beyond the region where the natural path of the helix of the tapered side wall extending from the leading edge of the tapered side wall intersects a radius extending through the cutting edge.

12. A cutting tool as defined by claim 6 characterized by, said cutting edge extending radially beyond the region where the natural path of the helix of the tapered side wall extending from the leading edge of the tapered side wall intersects a radius extending through the cutting edge.

13. A cutting tool for cutting round holes in sheet material comprising, a body having a cone-shape imparted to it by a tapered side wall with a cone angle of approximately twenty-five degrees, said tapered side wall being formed in a helical shape with a lead of about .008 inch per revolution providing a gradually increasing radial relief around the tapered side wall, said body being provided with first and second longitudinal flutes positioned between the ends of the tapered side wall and peripherally adjacent to each other with their walls intersecting each other to form a longitudinal cutting edge between the flutes at the periphery of the body, said cutting edge having approximately a ten to forty-five degree rake angle on its forward side created by the wall of the first flute, and on its rear side approximately a six degree relief angle with the periphery of the hole being cut created by the wall of the second flute.

14. A cutting tool as defined by claim 13 characterized by said second flute extending from the cutting edge to an edge on the tapered side wall where the radial relief between the cutting edge and the helix is about .002 inch.

15. A cutting tool for cutting round holes in sheet material comprising, a body having a tapered side wall imparting a cone shape thereto, said tapered side wall being formed on a helix with a small lead per revolution, said body being provided with a longitudinal flute having a cutting edge, and a radial relief extending from said cutting edge to said tapered side wall.

16. A cutting tool defined by claim 15 characterized by, said cutting edge extending radially beyond the region where the natural path of the helix of the tapered side wall intersects a radius extending through the cutting edge.

17. A cutting tool for cutting round holes in sheet material comprising, a body having a cone shape imparted to it by a tapered side wall extending longitudinally from a wide inner end to a narrow outer end, said tapered side wall being formed in a helical shape with a small lead per revolution providing a gradually increasing relief around the tapered side wall, said body being provided with a longitudinal flute and a radially relieved portion adjacent to each other with their walls intersecting each other to form a cutting edge at the periphery of the body.

18. A cutting tool defined by claim 17 characterized by, said cutting edge extending radially beyond the region where the natural path of the helix of the tapered side wall intersects a radius extending through the cutting edge.

19. A cutting tool for cutting round holes in sheet material comprising a body having a tapered side wall imparting a cone-shape thereto, said tapered side wall being formed on a helix with a small lead per revolution, said body being provided with a longitudinal flute having a cutting edge, and a radial relief extending from said cutting edge to said tapered side wall, the angle of the tapered side wall being approximately twenty-five degrees.

20. A cutting tool for cutting round holes in sheet material comprising, a body having a tapered side wall imparting a cone-shape thereto, said tapered side wall being formed on a helix with a small lead per revolution, said body being provided with a longitudinal flute having a cutting edge and a radial relief extending from said cutting edge to said tapered side wall, the angle of the tapered side wall being approximately ten to fifty degrees.

21. A cutting tool for enlarging holes in sheet material comprising, a body having a truncated cone shape imparted to it by a tapered side wall extending longitudinally from a wide portion to a narrow portion, said tapered side wall being formed in a helical shape with a small lead per revolution providing a gradually increasing relief around the tapered side wall, said body being provided with first and second longitudinal flutes positioned between the longitudinal edges of the tapered side wall and adjacent to each other with their walls intersecting each other to form a cutting edge between the flutes at the periphery of the body.

References Cited in the file of this patent

UNITED STATES PATENTS

| | | |
|---|---|---|
| 171,786 | Farmer | Jan. 4, 1876 |
| 1,923,177 | Tucker | Aug. 22, 1933 |
| 2,442,554 | Swiatek | June 1, 1948 |

FOREIGN PATENTS

| | | |
|---|---|---|
| 684,634 | France | Mar. 18, 1930 |